United States Patent Office 3,043,840
Patented July 10, 1962

3,043,840
PURIFICATION PROCESS FOR HYDRO-CHLOROTHIAZIDE
George V. Downing, Jr., Martinsville, N.J., assignor to Merck & Co., Inc., Rahway, N.J., a corporation of New Jersey
No Drawing. Filed Oct. 14, 1959, Ser. No. 846,274
5 Claims. (Cl. 260—243)

This invention relates to thiadiazine derivatives of the formula

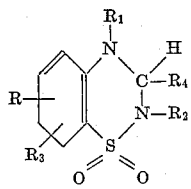

(I)

wherein R is hydrogen, halogen such as chlorine, bromine, fluorine or a halogen-like radical such as trifluoromethyl or trichloromethyl, nitro, lower alkyl advantageously having from about 1 to 5 carbon atoms, or a lower alkoxy radical also advantageously containing from about 1 to 5 carbon atoms in the alkyl portion of the radical; $R_1$ and $R_2$ is each hydrogen or a lower alkyl radical advantageously containing from about 1 to 5 carbon atoms; $R_3$ is hydrogen, sulfamyl, or lower alkyl substituted sulfamyl, the alkyl portion or portions of the radical advantageously containing from about 1–5 carbon atoms and preferably 1–3 carbon atoms; and $R_4$ is hydrogen or an alkyl radical advantageously containing from about 1–12 carbon atoms.

The thiadiazine derivatives can be produced by contacting a sulfamyl aniline compound of the formula

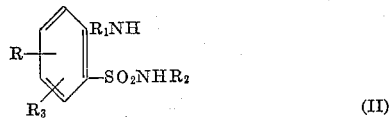

(II)

wherein R, $R_1$, $R_2$ and $R_3$ are as above, with an aliphatic aldehyde of the formula $R_4CHO$ wherein $R_4$ is as above, under conditions effective to result in condensation and the formation of the thiadiazine derivative.

It has been found that the yield and purity of the thiadiazine can be increased by forming an aqueous solution of ammonia or a water soluble primary or secondary amine and the reaction product of the condensation of the sulfamyl aniline compound and an aldehyde which includes the thiadiazine compound, and precipitating the thiadiazine compound from the solution. The treatment of the invention permits convenient production of the thiadiazine derivative having a phase purity of 95%.

The thiadiazine derivatives are useful chemotherapeutic agents having diuretic and/or natriuretic properties, or, as in the case of derivatives such as those in which $R_3$ is hydrogen, are useful as intermediates from which diuretics and/or natriuretics can be made by, for example, chlorosulfamation. A preferred thiadiazine derivative is 3,4-dihydro-6-chloro-7-sulfamyl-1,2,4-benzothiadiazine-1,1-dioxide, commonly referred to as 3,4-dihydrochlorothiazide.

The sulfamyl aniline compound employed in the condensation can be made by known methods. Thus, sulfamyl aniline compounds can be made by the method of Novello Patent 2,809,194. According to the Novello patent, an aniline compound is chlorosulfonated to produce a sulfonyl aniline compound which can be subjected to an ammoniating treatment to produce the corresponding sulfamyl aniline compound. The latter compound can be condensed with an aliphatic aldehyde to produce thiadiazine suitable for treatment according to the invention. The treatment of the invention is not dependent upon the manner in which the sulfamyl aniline compound is produced and methods other than those of the Novello patent can be employed.

The aldehyde employed in the condensation can be any aliphatic aldehyde. Aliphatic aldehydes having up to about 12 carbon atoms are suitable and the aldehydes or compounds which hydrolyze under the reaction conditions to yield aldehydes can be used. Thus, there can be used formaldehyde, paraformaldehyde, trioxane, paraldehyde, hexamethylene tetramine, chloral, acetaldehyde, propionaldehyde, isobutyraldehyde, caproaldehyde, nonaldehyde or lauraldehyde.

The condensation of the sulfamyl aniline compound and the aldehyde can be carried out in a liquid medium in the presence of a catalyst for the reaction. The medium can be aqueous or an organic medium, for example an alcoholic medium such as methanol, ethanol or isopropanol. The catalyst can be selected from those commonly used for condensation reactions. It can be acid or basic. Examples of suitable catalysts are sodium acetate, potassium carbonate, ammonium hydroxide, acetic acid, alkali metal hydroxide such as sodium hydroxide. The amount of catalyst employed can be that commonly used in organic syntheses.

In the preferred embodiment of the invention the aldehyde is formaldehyde. This can be added to the medium as such or can be added as formalin, for example 38% formalin. Preferably, a molar excess of formaldehyde is employed (i.e. the mole ratio of formaldehyde to the sulfamyl aniline compound is in excess of 1). Suitable molar ratios of formaldehyde to sulfamylanile compound are about 1.75 to 1. While amounts of formaldehyde in excess of the ratio of 1.75 to 1 can be used, ordinarily there will be no advantage in using larger amounts. Less than the stoichiometric amount of formaldehyde (ratio of 1 to 1) can be used but yields will be correspondingly lower. A preferred range for the mentioned ratio is 1.25–1.05.

The condensation with formaldehyde can be carried out by heating the reaction mixture at a temperature and for a time sufficient for the condensation to take place. Where a water medium is employed the reaction is heterogeneous, the sulfamyl aniline compound and the thiadiazine derivative produced being present as solids suspended in the medium, and, where an organic medium such as an aliphatic alcohol is employed, the reactants and products, in general, are present as solutes in the medium.

Where an aqueous medium is employed, the thiadiazine derivative can be recovered as a solid crude product by filtering and washing. Where the product is in solution at the conclusion of the condensation, it can be recovered by cooling to, e.g. −10° C. to 20° C., to precipitate the thiadiazine product and then filtering and washing. In the latter case, the solution can be made weakly acid before recovering the thiadiazine product, although this is not necessary to satisfactory operation.

The resulting solid crude thiadiazine product can be treated according to the invention by dissolving it in an aqueous solution of ammonia or water soluble primary and secondary amines and crystallizing the thiadiazine derivative from the aqueous amine medium. Suitable amines other than ammonia are methyl amine, dimethylamine, ethylamine, diethyl amine and aniline. The solution can be formed by heating an admixture of the solvent and crude material at an elevated temperature, e.g. the reflux temperature, and the resulting solution is advantageously held at this temperature for a short time. At the conclusion of the heating, if any solids are present, and normally none will be, the solution can be filtered hot. Crystallization of the thiadiazine derivative can then be effected by allowing the solution to cool gradually to about room temperature. Thus, where the amine employed is ammonia, the solution can be cooled from the reflux temperature, usually about 95 to 100° C. down to about 15 to 25° C. over a period of about ½ to 5 hours. A small amount of sulfamyl aniline compound, due to hydrolysis of the thiadiazine compound, as is more particularly described hereinafter, or due to presence thereof in the crude thiadiazine material, may be present in the solution, and the temperature to which the solution is cooled should not exceed that at which an appreciable amount of the sulfamyl aniline compound is precipitated.

Following the crystallization, the crystals are preferably aged at room temperature in the mother liquor. Suitable aging times are ½ to 2 hours depending on the cooling time. The aged crystals can then be recovered by filtering, washing with water until neutral and drying.

The amount of amine employed should be carefully selected. At least enough to solubilize the thiadiazine compound in the aqueous solution is required. The amount of amine should not, however, be so large as to hydrolyze the desired thiadiazine compound. Thus, at least about 0.8 mole of the amines, e.g. ammonia, per mole of thiadiazine compound should be used, and the mole ratio of the amine to thiadiazine compound should normally not exceed 3. Whether or not hydrolysis of the thiadiazine compound occurs depends on the amine concentration and the time, and the ratio can exceed 3 but normally should not exceed 5. Increasing the amount of the amine increases solubility of the thiadiazine but the increase is not great, and the use of more dilute amine solutions permits cooling to a lower temperature to precipitate the thiadiazine compound. The strength of the aqueous amine employed is not critical. It can be, for example, about 0.1 molar. A suitable range for the concentration is 0.05 to 0.2 molar and a preferred range is 0.09 to 0.13 molar. Suitable and most advantageous amounts of the amine can be readily determined by experiment so as to provide maximum yield of the thiadiazine product.

If desired, when an aqueous medium is employed, the treatment of the invention can be carried out without separating the thiadiazine compound from the medium in which it is formed. Thus, where a water medium is employed for the reaction of the sulfamylaniline compound and aldehyde, the treatment can be carried out by adding a suitable amount of the amine to the reaction product comprising an aqueous slurry of the thiadiazine derivative. Where an organic medium is employed and water is used to wash the thiadiazine compound, a slurry of partially washed precipitate of the thiadiazine compound can be treated with ammonia or aqueous ammonia to effect the treatment of the invention.

Where ammonium hydroxide is employed as the catalyst for the condensation reaction of the sulfamyl aniline compound and the aldehyde, and an aqueous medium is employed for the condensation, the condensation and purification can be combined in a single step. This, however, is not preferred since to provide an amount of ammonia suitable for the purification results in an excessive amount of ammonia for the condensation and for which suitable ammonia concentrations are about 0.1–0.01 mole of ammonia per mole of the sulfamyl aniline compound. The use of more ammonia than is suitable for the condensation is undesirable since reaction between ammonia and the aldehyde will occur to the extent that the yield of the thiadiazine compound is low and diazotizables in the product are high.

In the course of the production of the thiadiazine compounds from, for example aniline compounds, a decolorizing step may be employed at some point in the process. This can be done by treating the reaction product of the condensation reaction with decolorizing carbon. Such treatment, however, does not significantly effect purification and increase in concentration of thiadiazine compound.

The mechanism or phenomenon incidental to the treatment of the invention is not clearly understood and it is not intended to predicate the invention on any particular theory. It is believed, however, condensation products other than the thiadiazine compounds, the yields of which are increased according to the invention, are produced by the reaction of the sulfamyl aniline compound and the aldehyde. These other condensation products may be products in which the aldehyde and the sulfamyl aniline compounds are combined in a manner different from that in which they are combined in the thiadiazine compound. Dimers of the thiadiazine compounds may also be formed. The results of assays of the reaction product of the sulfamyl aniline compound and formaldehyde lend support to this theory. Thus, assay of crude thiadiazine material, which has been washed and dried so that no free formaldehyde is associated therewith, according to Anal. Chem. 23, 354 (1951), shows that there is present in the crude material formaldehyde combined in a form which is substantially more readily hydrolyzable to yield formaldehyde than is the thiadiazine compound. It may be postulated that the amine forms a complex with the loosely bound aldehyde and consequently affects the purification.

While the treatment of the invention is a purification in that it increases the concentration of the desired product, i.e. the thiadiazine compound in the product, it is not merely a purification in the sense that an increase of concentration of a desired material is effected by merely separating another material with which the desired material is admixed. Purification, in this sense, may be incidental to the treatment of the invention, but the desired increase in concentration is due in part at least to conversion of materials other than the desired thiadiazine derivatives to these thiadiazine derivatives.

*Example 1*

2,4-disulfamyl-5-chloroaniline crude (390 g.) which can be made by the method of Novello Patent 2,809,194, is admixed with ethanol 2B (4.0 l.) and water (4.0 l.) and the admixture is stirred and heated to reflux until all is in solution. The hot solution is cooled to 20° C., the crystalline product collected by suction filtration and displacement-washed twice with 50% aqueous ethanol. There is obtained 328 g. (84%) of purified disulfamyl chloroaniline, M.P. 260–261° C.

A mixture of purified 2,4-disulfamyl-5-chloroaniline (165 g.; 0.578 mole), methanol (1440 ml.), aqueous 38% formalin (52.0 ml.; 0.693 mole) and 4% aqueous sodium hydroxide (28 ml.; 0.028 mole) is stirred and heated under reflux for one and one-half hours. All goes into solution after ten minutes.

The reaction mixture is cooled to 60° C., treated for ten minutes with 17 g. of Norit A brand carbon to decolorize and is then filtered hot. The batch is cooled to 30° C., made weakly acidic by addition of 3 ml. of concentrated aqueous hydrochloric acid and concentrated in vacuum to a volume of 300 ml., whereupon crystallization of crude 3,4-dihydrochlorothiazide occurs. To remove methanol, water (200 ml.) is added to the slurry and the mixture is again concentrated to a volume of 300 ml. Water (700 ml.) is again added, the slurry is stirred at 30° C. for thirty minutes, and the product is filtered off. It is washed with 4 x 500 ml. of water and dried at 60° C. in vacuum. There is obtained 143 g. (83.5% of theory) of crude 3,4-dihydrochlorothiazide, M.P. 265–266° C.

The crude product obtained above is added to 4300 ml. of water, aqueous concentrated ammonia (29.0 ml. of 28% ammonia) is added, and the mixture is stirred and heated at reflux for ten minutes, whereupon the crude product dissolves. The mixture is allowed to cool to 25° C. over a 1½–2 hour period, aged at room temperature for one hour, filtered and the product is washed with water until neutral. It is dried at 60° C. in vacuum.

There is obtained 116.6 g. (81.5% recovery) of 3,4-dihydro-6-chloro-7-sulfamyl-1,2,4,-benzothiadiazine - 1,1-dioxide.

Melting point: 270–271° C.
Ultra violet (in methanol containing a trace of HCl):
λλ max. 316, 271, 226 mμ; A% 98.1, 635, 1242.
Phase purity: 95–100%.
Analysis: Calc'd for $C_7H_8O_4N_3S_2Cl$: C, 28.24; H, 2.71; N, 14.11. Found: C, 28.57; H, 2.70; N 14.38.
Diazotizables: 0.4%.

Example 2

A mixture of 5.72 grams of 2,4-disulfamyl-5-chloroaniline, purified as described in Example 1, 50 ml. of water, 1 ml. of 1.047 N NaOH and 1.58 ml. of 37% formalin is stirred and heated under reflux for 2 hours. During this treatment the solids go into solution and a crude thiadiazine product (crude 3,4-dihydro-6-chloro-7-sulfamyl-1,2,4-benzothiadiazine-1,1 - dioxide) precipitates out shortly thereafter. The crude product is recovered by filtering and washing. The crude product is purified according to the invention by mixing with 130 ml. of water, 1.2 ml. of 28% ammonium hydroxide and the resulting mixture is heated at reflux for 10 minutes, then cooled to 25° C. and neutralized with concentrated hydrochloric acid. The resulting crystals are filtered, washed with water and air dried. Yield: 5.505 g. (92.6%); M.P. 268–269° C.; diazotizables 0.28%; phase purity 97–98%.

The foregoing examples illustrate the treatment of the invention in terms of particular reaction conditions. The examples serve merely to illustrate the invention, however, and modifications such as are within the scope of the appended claims are included in the metes and bounds of the invention.

Thus, in the foregoing examples a sulfamyl aniline compound of the formula

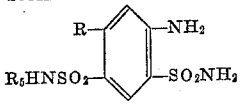

(III)

wherein R is a chlorine radical and $R_5$ is hydrogen is reacted with an aldehyde to produce the thiadiazine derivative. Alternatively, and with regard to compounds of particular interest, R can be a bromine, hydrogen, methyl or ethyl radical; and $R_5$ can be a lower alkyl group, advantageously containing up to about 5 and preferably 1–3 carbon atoms, to provide the sulfamyl group as a lower alkyl substituted sulfamyl radical. Further, the sulfamyl group in the 2-position of the aniline compound can be an N-alkyl substituted sulfamyl group such as, for example, an N-methyl sulfamyl radical. The sulfamyl aniline compound (III) upon condensation with an aldehyde provides the corresponding thiadiazine derivatives, and as well as the values set forth above for R in compound III, R can be any of the radicals mentioned therefore in reference to structural Formula I above.

What is claimed is:
1. In the method of producing a thiadiazine compound having the formula:

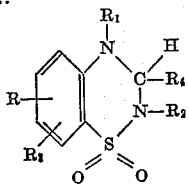

wherein R is selected from the group consisting of hydrogen, halogen, nitro, lower alkyl and lower alkoxy radicals, $R_1$ and $R_2$ are each selected from the group consisting of hydrogen and lower alkyl radicals, $R_3$ is selected from the group consisting of hydrogen, sulfamyl, and lower alkyl substituted sulfamyl radicals, and $R_4$ is selected from the group consisting of hydrogen and alkyl radicals having from 1 to 12 carbon atoms, by steps comprising heating a sulfamylaniline compound of the formula

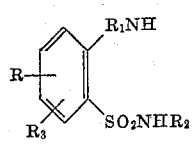

where R, $R_1$, $R_2$ and $R_3$ are as above, with an aliphatic aldehyde of the formula $R_4HCO$ wherein $R_4$ is as above, the improvement which comprises forming an aqueous solution of said thiadiazine and a thiadiazine-solubilizing, thiadiazine-non-hydrolyzing amount of an amine selected from the group consisting of ammonia and water soluble primary and secondary amines, and crystallizing said thiadiazine compound from the solution.

2. The method of claim 1 wherein the thiadiazine compound has the formula:

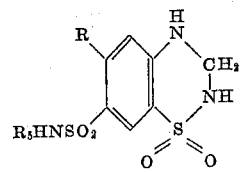

wherein R is as above and $R_5$ is selected from the group consisting of hydrogen and lower alkyl radicals, the sulfamyl aniline compound is of the formula

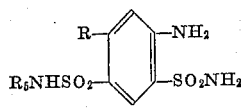

wherein R and $R_5$ are as above, the aliphatic aldehyde is formaldehyde and the amine is ammonia.

3. The method of claim 2, wherein R is halogen and $R_5$ is hydrogen.

4. The method of claim 3, wherein R is chlorine.

5. The method of preparing 3,4-dihydro-6-chloro-7-sulfamyl-1,2,4-benzothiadiazine-1,1-dioxide, which comprises heating 2,4-disulfamyl-5-chloroaniline with formaldehyde, forming an aqueous solution of the resulting crude 3,4-dihydrochlorothiazide and ammonia, and crystallizing substantially pure 3,4-dihydrochlorothiazide from said solution, whereby loosely-bound aldehydic impurities are also converted into substantially pure 3,4-dihydrochlorothiazide during said crystallization.

References Cited in the file of this patent
UNITED STATES PATENTS
2,809,194 Novello _____ Oct. 8, 1957
2,910,474 Novello _____ Oct. 27, 1959

OTHER REFERENCES
Vogel: A Textbook of Practical Organic Chemistry, pages 122–127 (1955), Third Edition.